(12) United States Patent
Sivakumar et al.

(10) Patent No.: US 11,481,415 B1
(45) Date of Patent: Oct. 25, 2022

(54) CORPUS TEMPORAL ANALYSIS AND MAINTENANCE

(71) Applicant: International Business Machines Corporation, Armonk, NY (US)

(72) Inventors: Gandhi Sivakumar, Bentleigh (AU); Rodolfo Lopez, Austin, TX (US); Louie A. Dickens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/217,871

(22) Filed: Mar. 30, 2021

(51) Int. Cl.
*G06F 16/332* (2019.01)
*G06F 16/338* (2019.01)
*G06F 16/901* (2019.01)
*G06F 40/216* (2020.01)
*G06F 16/33* (2019.01)

(52) U.S. Cl.
CPC ........ *G06F 16/3328* (2019.01); *G06F 16/338* (2019.01); *G06F 16/3344* (2019.01); *G06F 16/9024* (2019.01); *G06F 40/216* (2020.01)

(58) Field of Classification Search
CPC .................................................. G06F 16/3328
See application file for complete search history.

(56) References Cited

U.S. PATENT DOCUMENTS

| | | | |
|---|---|---|---|
| 5,748,188 A | 5/1998 | Hu | |
| 6,632,251 B1 | 10/2003 | Rutten | |
| 7,624,007 B2 | 11/2009 | Bennett | |
| 7,716,226 B2 | 5/2010 | Barney | |
| 7,899,666 B2 | 3/2011 | Varone | |
| 8,108,410 B2 | 1/2012 | Strosaker | |
| 8,209,304 B2 | 6/2012 | Petri | |
| 8,515,952 B2 | 8/2013 | Henzinger | |
| 9,563,846 B2 | 2/2017 | Allen | |

(Continued)

FOREIGN PATENT DOCUMENTS

| | | |
|---|---|---|
| CN | 104981799 A | 10/2015 |
| EP | 0687987 A1 | 12/1995 |

OTHER PUBLICATIONS

"Digging into digital images: Extracting batch location data automatically", Exposing the Invisible, downloaded from the internet on Mar. 24, 2021, 12 pages, <https://exposingtheinvisible.org/resources/image-digging/>.

(Continued)

*Primary Examiner* — Van H Oberly
(74) *Attorney, Agent, or Firm* — Gilbert Harmon, Jr.

(57) ABSTRACT

An approach to determining if a corpus is obsolete for the selected purpose. The approach can receive a corpus and a context from a user. The approach can extract terms from the corpus based on the context. The approach can generate a temporal context mapping of the terms. The approach can analyze the terms based on the temporal context mapping. The approach can determine if a further analysis of the temporal context mapping by a subject matter expert (SME) is necessary and if so, employ an SME for the analysis. The approach can determine if the corpus is obsolete for the selected purpose based on the temporal context mapping. The approach can delete the corpus from the repository and send the user an obsolete notice if the corpus is obsolete or can generate a corpus report and send the user the corpus report if the corpus is not obsolete.

17 Claims, 6 Drawing Sheets

(56) References Cited

U.S. PATENT DOCUMENTS

| | | | |
|---|---|---|---|
| 10,387,468 B2 | 8/2019 | Clark | |
| 2005/0234877 A1 | 10/2005 | Yu | |
| 2007/0083506 A1 | 4/2007 | Liddell | |
| 2010/0275054 A1* | 10/2010 | Grace | G06Q 10/10 |
| | | | 714/2 |
| 2014/0096249 A1* | 4/2014 | Dupont | G06F 21/00 |
| | | | 726/23 |
| 2014/0172847 A1* | 6/2014 | Wiegering | G06F 16/9535 |
| | | | 707/728 |
| 2014/0278351 A1 | 9/2014 | Clark | |
| 2015/0254555 A1 | 9/2015 | Williams, Jr. | |
| 2015/0317561 A1 | 11/2015 | Allen | |
| 2015/0356203 A1* | 12/2015 | Allen | G06F 16/3344 |
| | | | 707/725 |
| 2016/0378852 A1* | 12/2016 | Goldberg | G06F 16/3329 |
| | | | 707/722 |
| 2017/0293842 A1 | 10/2017 | Buchanan | |
| 2019/0251193 A1 | 8/2019 | Singuru | |
| 2020/0410292 A1 | 12/2020 | Trim | |

OTHER PUBLICATIONS

"HTML <time> datetime Attribute", w3schools.com, downloaded from the internet on Mar. 24, 2021, 5 pages, <https://www.w3schools.com/Tags/att_time_datetime.asp>.

Mell et al., "The NIST Definition of Cloud Computing", Recommendations of the National Institute of Standards and Technology, Special Publication 800-145, Sep. 2011, 7 pages.

\* cited by examiner

CORPUS TEMPORAL ANALYSIS AND MAINTENANCE

TECHNICAL FIELD

The present invention relates generally to corpus maintenance, and more specifically, to corpus maintenance based on a temporal analysis.

BACKGROUND

An industry trend is emerging towards "cognitive models" enabled via "Big Data" platforms. Such models termed as "cognitive entities" (CE) are designed to remember the past, interact with humans and their queries, continuously learn and refine the responses for the future. Cognitive solutions derive from a thin-weighted utterance based in interaction with heavy weighted corpus. In cases where a user interaction is collected and based on this manual interaction, a corpus footprint is identified and ingested. As time progresses, technology becomes faded, antiquated or obsolete. A corpus which is temporally obsolete, or less applied, can both impact the degree of cognition of the solution and increases the maintenance costs of the CE.

A need has evolved for providing intelligent functionality that recognizes a point in time when a corpus has become undesired in a CE and removal of the corpus is required.

BRIEF SUMMARY

According to an embodiment of the present invention, a computer-implemented method for determining if a corpus is obsolete for the selected purpose, the computer-implemented method comprising: receiving, by one or more processors, a context and a corpus from a user; extracting, by the one or more processors, terms from the corpus based on the context; generating, by the one or more processors, a temporal context mapping of the terms; analyzing, by the one or more processors, the terms based on the temporal context mapping; determining, by the one or more processors, if a subject matter expert (SME) analysis of the temporal context mapping is necessary; responsive to determining the SME analysis is necessary, performing, by the one or more processors, a SME analysis of the temporal context mapping; determining, by the one or more processors, if the corpus is obsolete for the selected purpose based on the temporal context mapping; responsive to determining the corpus is obsolete, deleting, by the one or more processors, the corpus from an associated corpus repository and sending, by the one or more processors, an obsolete corpus notification to the user; and responsive to determining the corpus is not obsolete, generating, by the one or more processors, a corpus report and sending, by the one or more processors, the corpus report to the user.

According to an embodiment of the present invention, a computer program product for determining if a corpus is obsolete for the selected purpose, the computer program product comprising: one or more non-transitory computer readable storage media and program instructions stored on the one or more non-transitory computer readable storage media, the program instructions comprising: program instructions to receive a context and a corpus from a user; program instructions to extract terms from the corpus based on the context; program instructions to generate a temporal context mapping of the terms; program instructions to analyze the terms based on the temporal context mapping; program instructions to determine if a subject matter expert (SME) analysis of the temporal context mapping is necessary; responsive to determining the SME analysis is necessary, program instructions to perform a SME analysis of the temporal context mapping; program instructions to determine if the corpus is obsolete for the selected purpose based on the temporal context mapping; responsive to determining the corpus is obsolete, program instructions to delete the corpus from an associated corpus repository and program instructions to send an obsolete corpus notification to the user; and responsive to determining the corpus is not obsolete, program instructions to generate a corpus report and program instructions to send the corpus report to the user.

According to an embodiment of the present invention, a computer system for determining if a corpus is obsolete for the selected purpose, the computer system comprising: one or more computer processors; one or more non-transitory computer readable storage media; and program instructions stored on the one or more non-transitory computer readable storage media, the program instructions comprising: program instructions to receive a context and a corpus from a user; program instructions to extract terms from the corpus based on the context; program instructions to generate a temporal context mapping of the terms; program instructions to analyze the terms based on the temporal context mapping; program instructions to determine if a subject matter expert (SME) analysis of the temporal context mapping is necessary; responsive to determining the SME analysis is necessary, program instructions to perform a SME analysis of the temporal context mapping; program instructions to determine if the corpus is obsolete for the selected purpose based on the temporal context mapping; responsive to determining the corpus is obsolete, program instructions to delete the corpus from an associated corpus repository and program instructions to send an obsolete corpus notification to the user; and responsive to determining the corpus is not obsolete, program instructions to generate a corpus report and program instructions to send the corpus report to the user.

Other aspects and embodiments of the present invention will become apparent from the following detailed description, which, when taken in conjunction with the drawings, illustrate by way of example the principles of the invention.

DETAILED DESCRIPTION

Figure 1:
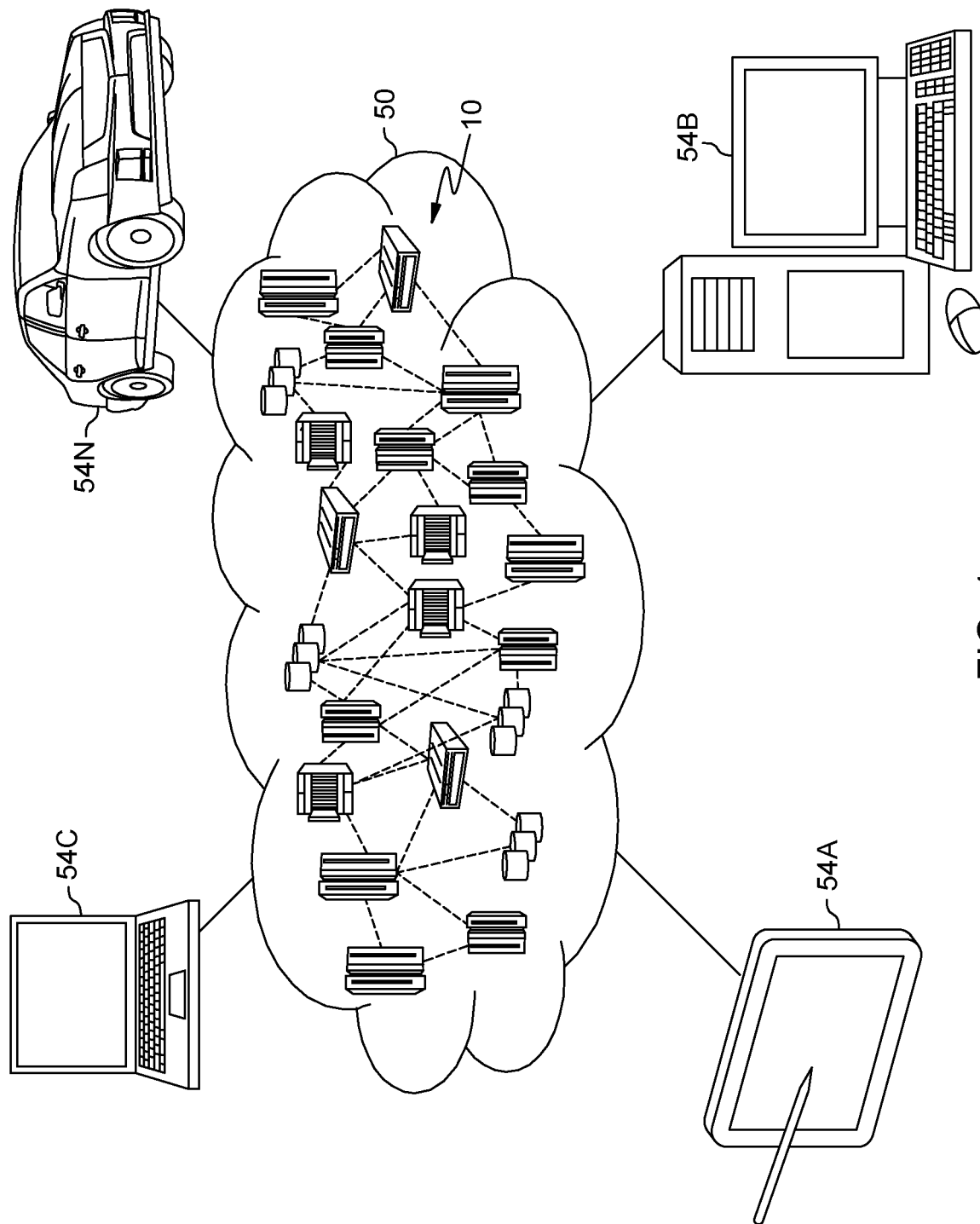
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of a corpus temporal analysis and maintenance mechanism that can, if desired, co-exist with a corpus ingestion application. The herein described embodiments can perform mapping of temporal aspects of terms and concepts associated with the corpus when the corpus is selected for interaction. Under circumstances where configurable temporal criteria are met, the embodiments described herein can provide notice to a corpus user of questionable temporal characteristics and, either automatically or manually by user selection, allow the exclusion of an obsolete corpus from future selection in view of a query and the associated analysis.

Embodiments of the present invention can assess a corpus at various levels of granularity, e.g., from a high level of granularity, including topics and segments, to a low level of granularity such as, but not limited to a sentence evaluation. Assessment by embodiments of the present invention can determine the temporal relevance of various levels of adoption of a corpus.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
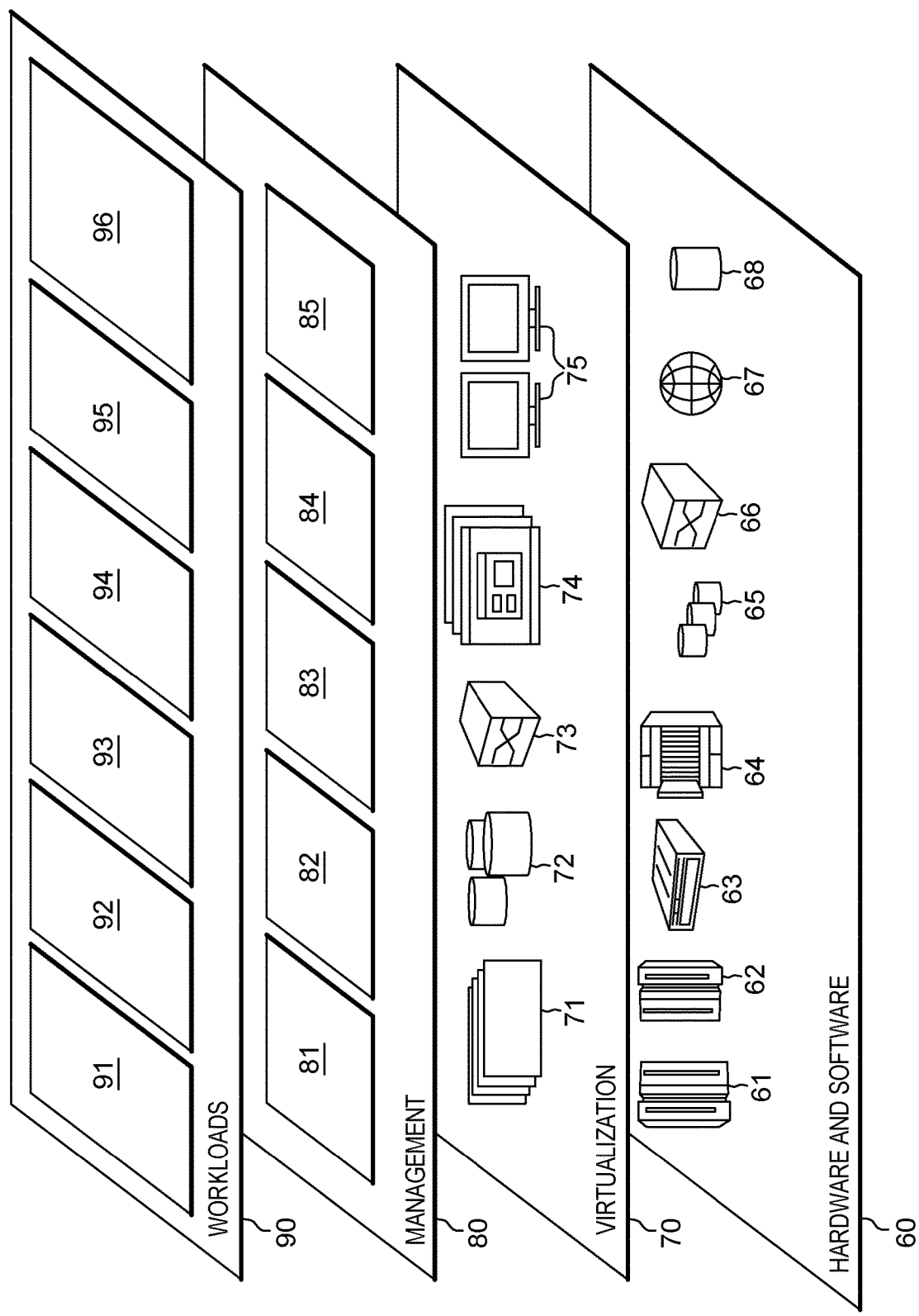
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and corpus temporal analysis and maintenance management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
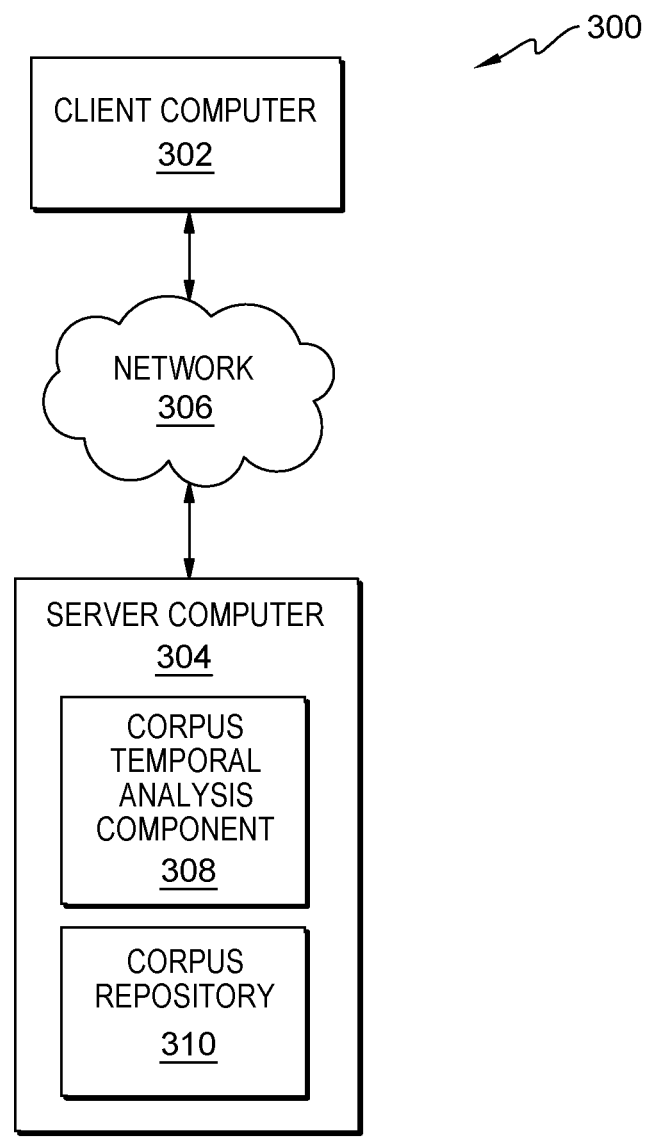
FIG. 3 is a high-level architecture, according to embodiments of the present invention.
Figure 4:
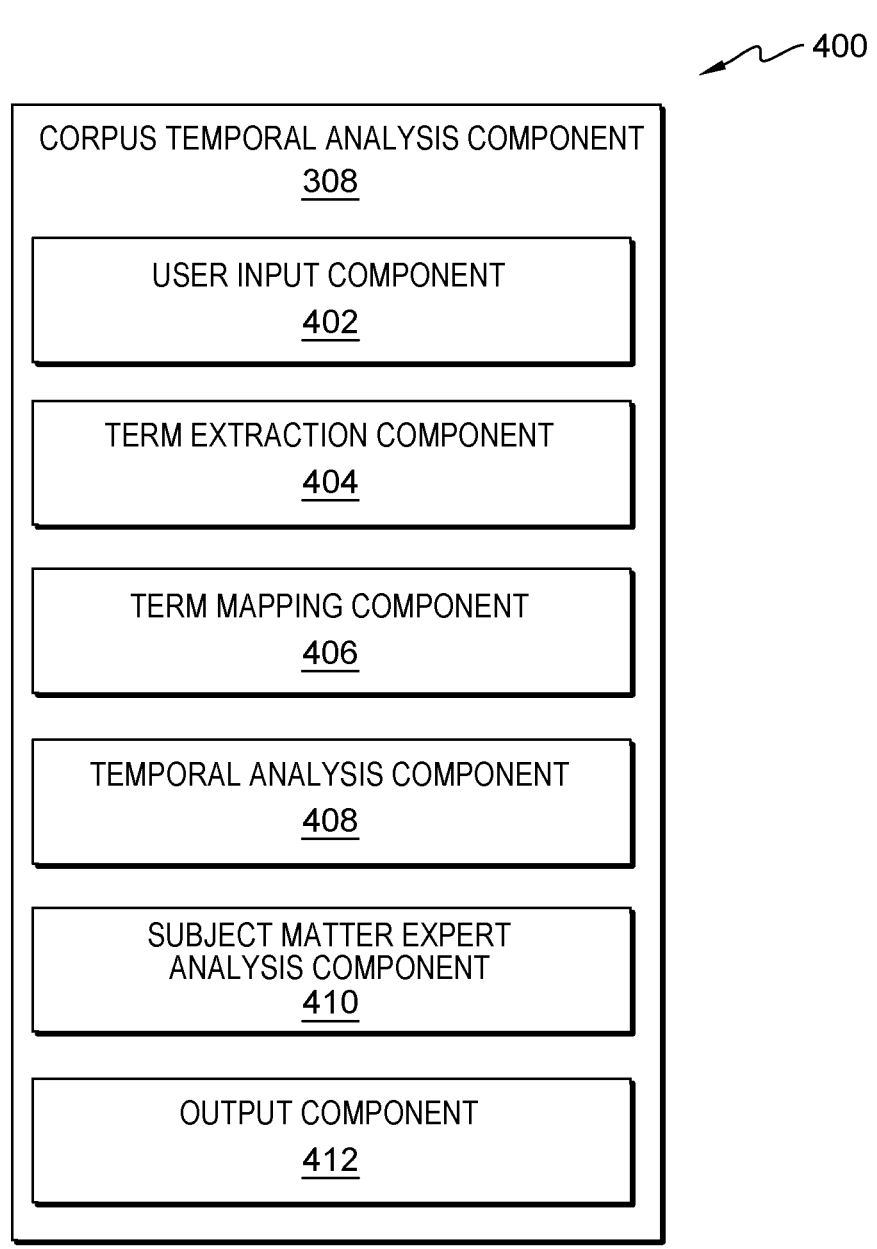
FIG. 4 is an exemplary detailed architecture, according to embodiments of the present invention.
Figure 5:
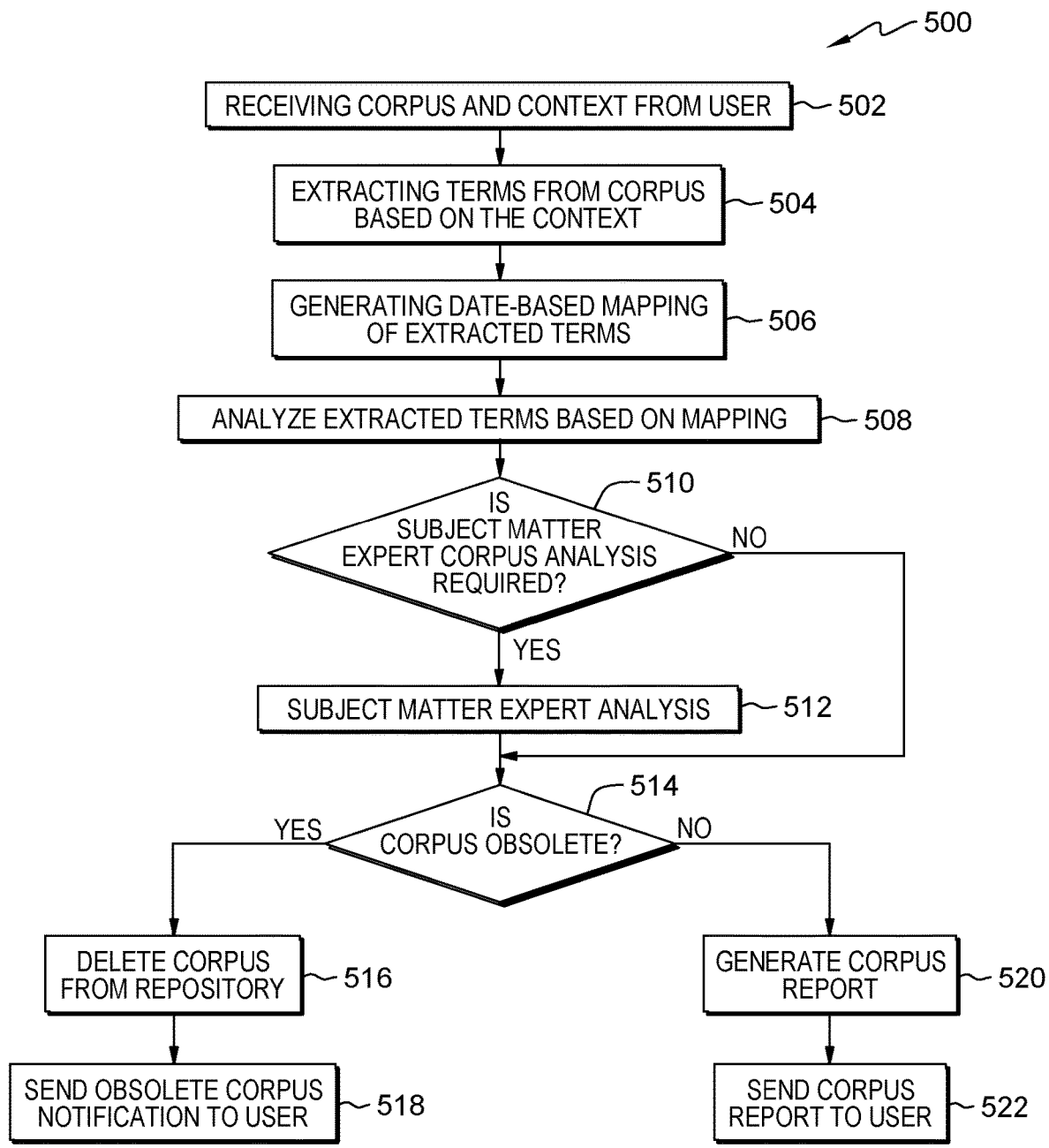
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a corpus temporal analysis system determining an obsolete corpus, to which the invention principles may be applied. The architecture 300 comprises a client computer 302, a corpus temporal analysis component 308 operational on a server computer 304, a corpus repository 310 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

Corpus temporal analysis component 308, operational on server computer 304, can receive input from a user wherein the input includes a corpus of interest and a query for evaluation against the corpus. In one aspect of an embodiment, corpus temporal analysis component 308 can extract terms and concepts, related to the query, from the corpus. In another aspect of an embodiment, corpus temporal analysis component 308 can generate a date-based mapping of the terms and concepts extracted from the corpus. It should be noted that the mapping can be dates and/or date ranges that the associated terms and concepts were viewed as "current" with respect to their applicability for their intended purpose.

Corpus temporal analysis component 308 can analyze the extracted terms based on the mapping and generate statistics for determining whether the corpus is obsolete for the intended purpose associated with the query. In another aspect, corpus temporal analysis component 308 can, under appropriate circumstances, employ the use of a subject matter expert (SME) for a validating analysis. In another aspect, corpus temporal analysis component 308, based on the analysis, can determine if the corpus is obsolete. If corpus temporal analysis component 308 determines the corpus is obsolete, then corpus temporal analysis component 308 can delete the corpus from the repository 310 and send the user a notification that the selected corpus is obsolete. If corpus temporal analysis component 308 determines the corpus is not obsolete, then corpus temporal analysis component 308 can generate a corpus report and send the user the corpus report.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a corpus temporal analysis component 308, which can further comprise a user input component 402, a term extraction component 404, a term mapping component 406, a temporal analysis component 408, a subject matter expert analysis component 410 and an output component 412.

In one embodiment, user input component 402 can provide the capability for a user to select a corpus of interest from corpus repository 310 and can generate a context the user wants exercised against the corpus with regard to determining if the corpus, or portions thereof, are obsolete and should be removed from the corpus repository 310. User input component 402 can provide the user selected corpus and context to term extraction component 404 for further processing.

It should be noted that if the user does not provide a context to constrain the corpus evaluation, then the entire corpus can be evaluated and if determined to be obsolete, the entire corpus can be removed from corpus repository 310. It should also be noted that a context can be, but is not limited to, a list of terms, a query, a description of a problem, etc. for limiting applicable matter comprised by the corpus.

In one aspect of an embodiment, term extraction component 404 can provide the capability, to extract terms of interest from the corpus using technology such as, but not limited to, an unstructured information management architecture (UIMA), e.g., International Business Machines Corporation's Watson. It should be noted that the UIMA architecture can provide a component software architecture for the development, discovery, composition, and deployment of multi-modal analytics for the analysis of unstructured information and integration with search technologies.

In another aspect of the embodiment, term extraction component 404 can provide a corpus pipeline capable of tagging the identified terms of interest with a temporal context. In a further aspect of the embodiment, the temporal context is constructed based on a "ground truth," provided by a SME, a minimal learning machine (MLM) and rule-based inputs. It should be noted that a temporal context can comprise a date or range of dates when the identified terms are identified as applicable for the presented intended use base on the query.

It should be noted that a ground truth may be thought of as a conceptual term relative to the knowledge of the truth concerning a specific question, i.e., the ground truth is the ideal expected result to the query. It should further be noted that a MLM is a supervised learning method that requires the adjustment of a single hyper parameter. It should also be noted that the aforementioned convergence has a hierarchy of varying levels, e.g., time, year, year range, etc.

In one embodiment, term mapping component 406 can provide the capability to organize the extracted terms based on the temporal tagging described previously. It should be noted that the mapping can be organized as a chronological map from oldest terms to newest terms. For example, consider an excerpt from a corpus for unsoldering a capacitor from circuit board wherein a query "How to perform unsoldering of capacitors using a soldering iron?" was presented against a corpus. An excerpt from the corpus provides the instructions . . . .

1) Heat the soldering iron; Apply flux on the surface mount technology (SMT) capacitor; Apply heat to the capacitor (do not overheat the capacitor); Remove the capacitor.

2) Apply grease flux on the through-hole technology (THT) board; Heat the solder rod and turn the THT board upside down; Cut the protruding edge with a side cutter and place the heated rod at the cut.

These sets of instructions for SMT and THT capacitor removal can then be mapped by term mapping component 406 based on the temporal tagging of their extracted terms. For example, the terms and their temporal tags based on the UIMA pipeline can be "Grease Flux (1985-2000)," "THT (1985-2005)," "Capacitor (1980-2021)," "Triode Capacitor (1980-1990)," and "SMT (2000-2021)." Accordingly, term mapping component 406 can create a mappable collection of terms and a mapping can be based on criteria such as, but not limited to, the earliest date of use, the latest date of use, the length of time in use, etc.

In one embodiment of the present invention, temporal analysis component 408 can provide the capability to analyze the temporal context, tagged by term extraction component 404, of the mapping provided by the term mapping component 406. Temporal analysis component 408 can evaluate the extracted terms, based on the temporal context, assess if the term is describing a technology that is now obsolete, has been superseded by advancements in the described technology, has been replaced by different technology, etc. It should be noted that this evaluation is based on the temporal context relative to other available sources and not on an in-depth understanding of the term and/or the associated technology.

In another embodiment, subject matter expert (SME) analysis component 410 can provide the capability to evaluate the extracted terms, in view of their temporal mapping, by a SME person having an in-depth understanding of the extracted terms and their associated technology. SME analysis component 410 can validate the mapping with regard to the assignment of the temporal tagging and can provide temporal tagging input for extracted terms that were unable to be temporally tagged by term extraction component 404. It should be noted that SME analysis component 410 can use a specific SME person predetermined based on the selected corpus or can use a crowd-sourced group of SME persons for the evaluation/validation.

In another aspect of the embodiment, SME analysis component 410 can perform an analysis based on criteria such as, but not limited to, user selection, the expiration of a predetermined time period since the last SME analysis, the recognition that the implicated corpus has not been previously evaluated by a SME, the recognition that the applicable portion of corpus has not been previously evaluated, etc.

In one aspect of an embodiment, output component 412 can generate a corpus report based on the analysis performed by temporal analysis component 408 and, if performed, by SME analysis component 410. The corpus report can comprise the temporal context mapping, e.g., the terms and the dates/date ranges that the technology is applicable, and a graphical representation of the temporal context mapping. Output component 412 can also provide an overall freshness rating of the corpus for the intended purpose, wherein a user can make a final determination if the selected corpus is suitable for the user's purpose.

FIG. 5 is an exemplary flowchart of a method 500 for determining if a corpus is obsolete for an intended purpose based on a temporal mapping of terms extracted from the corpus in view of a context. At step 502, an embodiment can receive, via user input component 402, a context and a corpus from a user. At step 504, the embodiment can extract terms from the corpus, via term extraction component 404, based on the context. At step 506, the embodiment can generate a temporal context mapping of the terms, via term mapping component 406. At step 508, the embodiment can analyze, via temporal analysis component 408, the terms based on the temporal context mapping. At step 510, the embodiment can determine, via corpus temporal analysis component 308, if a SME analysis, via SME analysis component 410, of the temporal context mapping is necessary. If a SME analysis is necessary, then at step 512, the embodiment can perform, via SME analysis component 410, a SME analysis of the temporal context mapping. If a SME analysis is not necessary, then proceed to set 514. At step 514, the embodiment can determine, via corpus temporal analysis component 308, if the corpus is obsolete. If the corpus is obsolete, then the embodiment, at step 516, can delete the corpus from the repository and at step 518, the embodiment can send a notice to the user advising that the selected corpus is obsolete and has been removed. If the corpus is not obsolete, then the embodiment, at step 520, can generate, via output component 412, a corpus report and at step 522, the embodiment can send the corpus report to the user.

Figure 6:
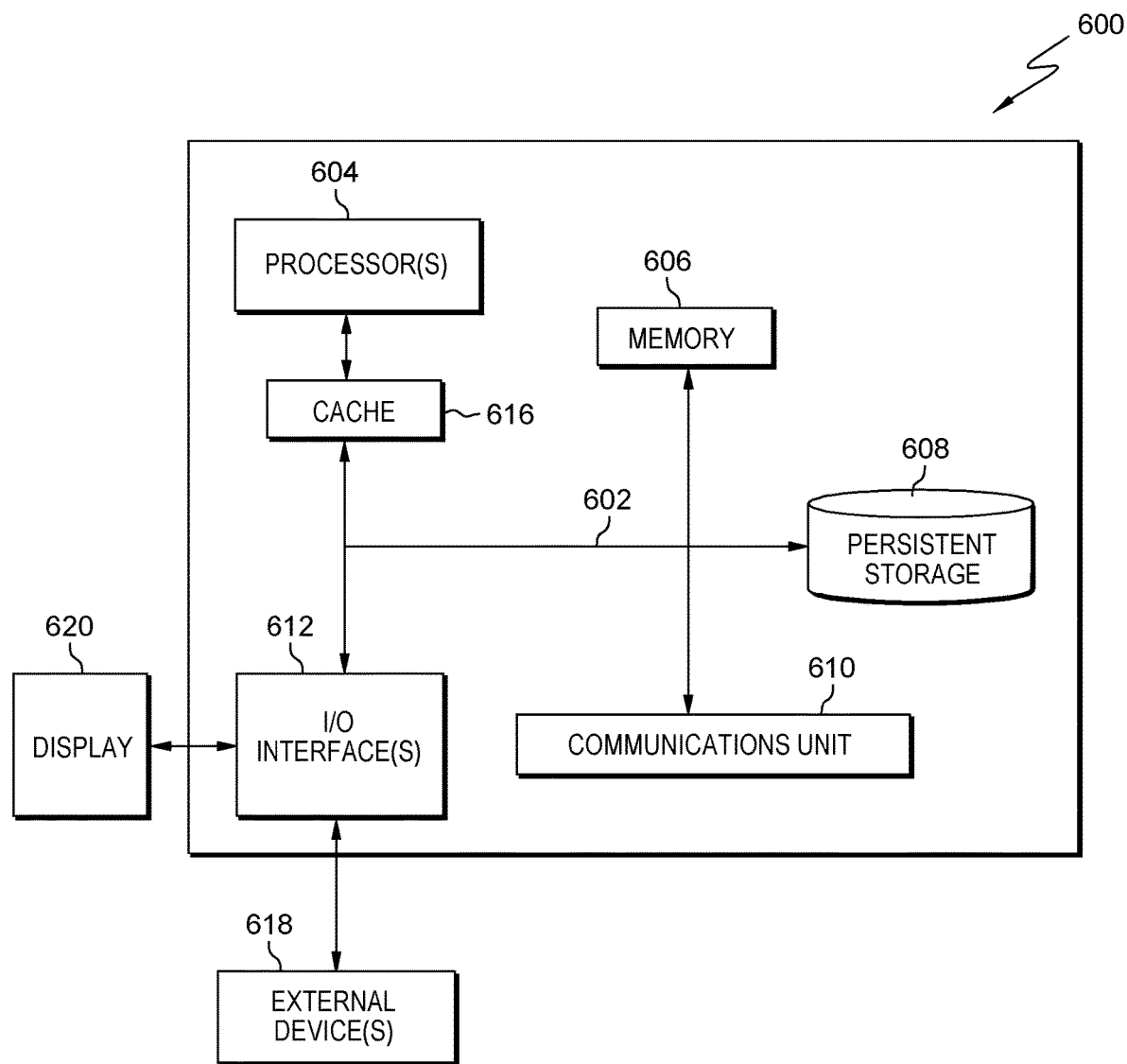
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O inter-face(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining if a corpus is obsolete for the selected purpose, the computer-implemented method comprising:
   receiving, by one or more processors, a context and a corpus from a user;
   extracting, by the one or more processors, terms from the corpus based on the context;
   generating, by the one or more processors, a temporal context mapping of the terms;
   analyzing, by the one or more processors, the terms based on the temporal context mapping;
   determining, by the one or more processors, if a subject matter expert (SME) analysis of the temporal context mapping is necessary;
   responsive to determining the SME analysis is necessary, performing, by the one or more processors, a SME analysis of the temporal context mapping;
   determining, by the one or more processors, if the corpus is obsolete for the selected purpose based on a predetermined percentage of terms exceeding a predetermined time period from the temporal context mapping times of the terms and a time when the temporal context mapping was performed;
   responsive to determining the corpus is obsolete, deleting, by the one or more processors, the corpus from an associated corpus repository and sending, by the one or more processors, an obsolete corpus notification to the user; and
   responsive to determining the corpus is not obsolete, generating, by the one or more processors, a corpus report and sending, by the one or more processors, the corpus report to the user.

2. The computer-implemented method of claim 1, wherein the context is a query.

3. The computer-implemented method of claim 1, wherein the temporal context mapping of the terms is performed based on an unstructured information management architecture (UIMA) pipeline processing of the terms.

4. The computer-implemented method of claim 1, wherein determining if the SME analysis is necessary is based on a user selection to perform the SME analysis.

5. The computer-implemented method of claim 1, wherein determining if the SME analysis is necessary is based on a time period since the previous SME analysis being greater than a predetermined time period.

6. The computer-implemented method of claim 1, wherein the corpus report comprises the temporal context mapping and a graphical representation of the temporal context mapping.

7. A computer program product for determining if a corpus is obsolete for the selected purpose, the computer program product comprising:
   one or more non-transitory computer readable storage media and program instructions stored on the one or more non-transitory computer readable storage media, the program instructions comprising:

program instructions to receive a context and a corpus from a user;
program instructions to extract terms from the corpus based on the context;
program instructions to generate a temporal context mapping of the terms;
program instructions to analyze the terms based on the temporal context mapping;
program instructions to determine if a subject matter expert (SME) analysis of the temporal context mapping is necessary;
responsive to determining the SME analysis is necessary, program instructions to perform a SME analysis of the temporal context mapping;
program instructions to determine if the corpus is obsolete for the selected purpose based on a predetermined percentage of terms exceeding a predetermined time period from the temporal context mapping times of the terms and a time when the temporal context mapping was performed;
responsive to determining the corpus is obsolete, program instructions to delete the corpus from an associated corpus repository and program instructions to send an obsolete corpus notification to the user; and
responsive to determining the corpus is not obsolete, program instructions to generate a corpus report and program instructions to send the corpus report to the user.

8. The computer program product of claim 7, wherein the context is a query.

9. The computer program product of claim 7, wherein the temporal context mapping of the terms is performed based on an unstructured information management architecture (UIMA) pipeline processing of the terms.

10. The computer program product of claim 7, wherein determining if the SME analysis is necessary is based on a user selection to perform the SME analysis.

11. The computer program product of claim 7, wherein determining if the SME analysis is necessary is based on a time period since the previous SME analysis being greater than a predetermined time period.

12. The computer program product of claim 7, wherein the corpus report comprises the temporal context mapping and a graphical representation of the temporal context mapping.

13. A computer system for determining if a corpus is obsolete for the selected purpose, the computer system comprising:
one or more computer processors;
one or more non-transitory computer readable storage media; and
program instructions stored on the one or more non-transitory computer readable storage media, the program instructions comprising:
program instructions to receive a context and a corpus from a user;
program instructions to extract terms from the corpus based on the context;
program instructions to generate a temporal context mapping of the terms;
program instructions to analyze the terms based on the temporal context mapping;
program instructions to determine if a subject matter expert (SME) analysis of the temporal context mapping is necessary;
responsive to determining the SME analysis is necessary, program instructions to perform a SME analysis of the temporal context mapping;
program instructions to determine if the corpus is obsolete for the selected purpose based on a predetermined percentage of terms exceeding a predetermined time period from the temporal context mapping times of the terms and a time when the temporal context mapping was performed;
responsive to determining the corpus is obsolete, program instructions to delete the corpus from an associated corpus repository and program instructions to send an obsolete corpus notification to the user; and
responsive to determining the corpus is not obsolete, program instructions to generate a corpus report and program instructions to send the corpus report to the user.

14. The computer system of claim 13, wherein the context is a query.

15. The computer system of claim 13, wherein the temporal context mapping of the terms is performed based on an unstructured information management architecture (UIMA) pipeline processing of the terms.

16. The computer system of claim 13, wherein determining if the SME analysis is necessary is based on a user selection to perform the SME analysis or is based on a time period since the previous SME analysis being greater than a predetermined time period.

17. The computer system of claim 13, wherein the corpus report comprises the temporal context mapping and a graphical representation of the temporal context mapping.

* * * * *